US011113815B2

(12) United States Patent
Vlachos et al.

(10) Patent No.: US 11,113,815 B2
(45) Date of Patent: Sep. 7, 2021

(54) VIDEO PROCESSING METHODS AND SOFTWARE ARCHITECTURES FOR ANALYZING TRANSFORMATION IN OBJECTS

(71) Applicant: Purdue Research Foundation, West Lafayette, IN (US)

(72) Inventors: Pavlos P Vlachos, West Lafayette, IN (US); Brett Meyers, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 65 days.

(21) Appl. No.: 16/697,121

(22) Filed: Nov. 26, 2019

(65) Prior Publication Data

US 2020/0175686 A1 Jun. 4, 2020

Related U.S. Application Data

(60) Provisional application No. 62/774,040, filed on Nov. 30, 2018.

(51) Int. Cl.
*G06T 7/00* (2017.01)
*G06T 5/50* (2006.01)
*G06K 9/00* (2006.01)
*G06T 7/32* (2017.01)
*G06T 7/37* (2017.01)
(Continued)

(52) U.S. Cl.
CPC .......... *G06T 7/0016* (2013.01); *G06K 9/0061* (2013.01); *G06K 9/00744* (2013.01); *G06K 9/3241* (2013.01); *G06K 9/4614* (2013.01); *G06K 9/623* (2013.01); *G06T 5/007* (2013.01);

*G06T 5/40* (2013.01); *G06T 5/50* (2013.01); *G06T 7/32* (2017.01); *G06T 7/37* (2017.01);
(Continued)

(58) Field of Classification Search
CPC .......... G06T 7/0016; G06T 5/50; G06T 7/32; G06T 7/37; G06T 5/40; G06T 7/62; G06T 5/007; G06T 2207/30041; G06T 2207/10016; G06T 2207/30201; G06T 2207/10024; H04N 9/67; H04N 9/646; H04N 9/77; G06K 2009/363; G06K 9/3241; G06K 9/00744; G06K 9/0061; G06K 9/4614; G06K 9/623
See application file for complete search history.

(56) References Cited

U.S. PATENT DOCUMENTS

| 7,706,606 | B1* | 4/2010 | Ruzon | ................ H04N 1/40012 382/162 |
| 2015/0206309 | A1* | 7/2015 | Yang | ........................ G06T 7/38 382/218 |
| 2017/0061588 | A1* | 3/2017 | Lee | ........................... G06T 5/50 |

OTHER PUBLICATIONS

Li, D., Winfield, D. and Parkhurst, D.J., 2005, September. Starburst: A hybrid algorithm for video-based eye tracking combining feature-based and model-based approaches. In 2005 IEEE Computer Society Conference on Computer Vision and Pattern Recognition (CVPR'05)-Workshops (pp. 79-79). IEEE.*

(Continued)

*Primary Examiner* — Zhitong Chen
(74) *Attorney, Agent, or Firm* — Purdue Research Foundation (57) ABSTRACT

Video processing methods and the associated system architecture for measuring transformation in objects, including pupils, entail the following steps: 1. Motion correction; 2. Object (eye) detection; 3. Image correction; and 4. Fourier-based analysis for item (in some embodiments the item is a pupil) motion estimation.

20 Claims, 2 Drawing Sheets

(51) Int. Cl.

| | | |
|---|---|---|
| *G06K 9/46* | (2006.01) | |
| *H04N 9/67* | (2006.01) | |
| *H04N 9/64* | (2006.01) | |
| *G06T 5/40* | (2006.01) | |
| *H04N 9/77* | (2006.01) | |
| *G06K 9/62* | (2006.01) | |
| *G06T 7/62* | (2017.01) | |
| *G06T 5/00* | (2006.01) | |
| *G06K 9/36* | (2006.01) | |
| *G06K 9/32* | (2006.01) | |

(52) U.S. Cl.
CPC ............... *G06T 7/62* (2017.01); *H04N 9/646* (2013.01); *H04N 9/67* (2013.01); *H04N 9/77* (2013.01); *G06K 2009/363* (2013.01); *G06T 2207/10016* (2013.01); *G06T 2207/10024* (2013.01); *G06T 2207/30041* (2013.01); *G06T 2207/30201* (2013.01)

(56) References Cited

OTHER PUBLICATIONS

Santini, T., Fuhl, W. and Kasneci, E., 2018. PuRe: Robust pupil detection for real-time pervasive eye tracking. Computer Vision and Image Understanding, 170, pp. 40-50.*

Grundland, M. and Dodgson, N.A., 2007. Decolorize: Fast, contrast enhancing, color to grayscale conversion. Pattern Recognition, 40(11), pp. 2891-2896.*

* cited by examiner

VIDEO PROCESSING METHODS AND SOFTWARE ARCHITECTURES FOR ANALYZING TRANSFORMATION IN OBJECTS

CROSS-REFERENCE TO RELATED APPLICATIONS

The present U.S. patent application is related to and claims the priority benefit of U.S. Provisional Patent Application Ser. No. 62/774,040, filed Nov. 30, 2018, the contents of which is hereby incorporated by reference in its entirety into this disclosure.

TECHNICAL FIELD

This disclosure relates to video processing methods and software architectures for analyzing transformation in objects.

BACKGROUND

This section introduces aspects that may help facilitate a better understanding of the disclosure. Accordingly, these statements are to be read in this light and are not to be understood as admissions about what is or is not prior art.

Pupillary Light Reflex (PLR) is a neurological response to regulate the amount of light entering the eye. A healthy eye's response to light stimulus is characterized by: parasympathetic constriction of the simulated pupil; consensual constriction of the untested pupil; and sympathetic dilation of both pupils after simulation subsides.

Because PLR is characteristically uniform across the human population, light based PLR tests can identify neurological changes in patients. Conventionally, such tests are typically made by observation, and hence, are susceptive to human error which can lead to misdiagnosis. The algorithm based systems that are available often rely on low accuracy measurement methods where accuracy worsens with smaller pupil sizes, which can lead to 20%-45% in error values.

SUMMARY

One aspect of the present disclosure relates to software architecture encoded on a non-transitory computer readable medium, the software architecture processing a method of processing a video, wherein the method includes discarding a set of unusable frames from a video, wherein the video includes an object of interest. The method further includes selecting a set of usable frames and a reference frame from the video. Additionally, the method includes performing a first registration of each usable frame of the set of useable frames to the reference frame, thereby generating a set of updated usable frames. Further, the method includes storing a plurality of variables corresponding to the object of interest from each updated usable frame using a feature extraction algorithm. Moreover, the method includes detecting the object of interest from the each updated usable frame using the feature extraction algorithm. Additionally, the method includes determining a sub region containing the object of interest in the each updated useable frame. Further, the method includes performing color image contrast enhancement on each sub region of the each updated usable frame, thereby producing a plurality of enhanced updated usable sub region frames. Additionally, the method includes converting each enhanced updated useable sub region frame of the plurality of enhanced updated usable sub region frames into a grayscale sub region frame, thereby producing a plurality of greyscale sub region frames. Further, the method includes performing a second registration of each greyscale sub region frame of the plurality of greyscale sub region frames, thereby generating a plurality of updated greyscale sub region frames. Furthermore, the method includes calculating transformation parameters between each of the plurality of updated greyscale sub region frames. In some embodiments, the method includes calculating a scaling coefficient between each of the plurality of updated greyscale sub region frames.

Still another aspect of the present disclosure relates to a software architecture encoded on a non-transitory computer readable medium, wherein the software architecture includes a first protocol, wherein the first protocol is configured to discard a set of unusable frames from a video, wherein the video includes an object of interest. The architecture further includes a second protocol, wherein the second protocol is configured to select a set of usable frames and a reference frame from the video. Additionally, the architecture includes a third protocol, wherein the third protocol is configured to perform a first registration of each usable frame of the set of useable frames to the reference frame, thereby generating a set of updated usable frames. Further, the architecture includes a fourth protocol, wherein the fourth protocol is configured to store a plurality of variables corresponding to the object of interest from each updated usable frame using a feature extraction algorithm. Moreover, the architecture includes a fifth protocol, wherein the fifth protocol is configured to detect the object of interest from the each updated usable frame using the feature extraction algorithm. Additionally, the architecture includes a sixth protocol, wherein the sixth protocol is configured to determine a sub region containing the object of interest in the each updated useable frame. Further, the architecture includes a seventh protocol, wherein the seventh protocol is configured to perform color image contrast enhancement on each sub region of the each updated usable frame, thereby producing a plurality of enhanced updated usable sub region frames. Additionally, the architecture includes an eighth protocol, wherein the eighth protocol is configured to convert each enhanced updated useable sub region frame of the plurality of enhanced updated usable sub region frames into a grayscale sub region frame, thereby producing a plurality of greyscale sub region frames. Further, the architecture includes a ninth protocol, wherein the ninth protocol is configured to perform a second registration of each greyscale sub region frame of the plurality of greyscale sub region frames, thereby generating a plurality of updated greyscale sub region frames. Furthermore, the architecture includes a tenth protocol, wherein the tenth protocol is configured to calculate transformation parameters between each of the plurality of updated greyscale sub region frames. In some embodiments, the tenth protocol includes an eleventh protocol, wherein the eleventh protocol is configured to calculate a scaling coefficient between each of the plurality of updated greyscale sub region frames.

Various aspects of the present disclosure relate to a video processing methods that can be used in PLR. Such methods are compatible with any imaging platform to deliver an automated, accurate, and objective measurement in real-time. Such video processing methods are compatible with most lighting conditions, deliver high accuracy measurement of pupil dilation rate, are agnostic to eye color, and serve as an adaptable platform technology for mobile and stationary devices.

BRIEF DESCRIPTION OF DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

Video processing methods and the associated system architecture for measuring transformation in objects, including pupils, entail the following steps: 1. Motion correction; 2. Object (eye) detection; 3. Image correction; and 4. Fourier-based analysis for item (in some embodiments the item is a pupil) motion estimation.

In one or more embodiments, the motion correction removes subject and tester motions to stabilize frames. This is performed by using frame-to-frame rigid registration. The above registration method estimates translation motion due to movement and magnification increase/decrease to output a motion-stabilized or motion-corrected video. In various embodiments, the estimated values are obtained through Fourier correlations, and magnification is measured by estimating displacements in a polar reference frame.

The object (eye) detection uses Harr-like feature detection to identify the eye. Harr-like features are image elements that correspond to Harr wavelet filters. Since certain filters correlate strongly with eyes that allow for automatic detection, identification results are used to crop the media to preserve only the eye which is used for further analysis in subsequent steps.

Image correction using temporary color space transform and histogram equalization enables improved pupil-to-iris contrast for light and dark eyes. The increase in contrast is performed during a temporary color-space transform to Hue-Saturation-Luminance (HSL) color-space. In one or more embodiments, the algorithm then performs histogram equalization on the S & L channels on the HSL space. The images are then transformed back to Red-Green-Blue (RGB) color-space to perform PLR measurements.

Figure 1:
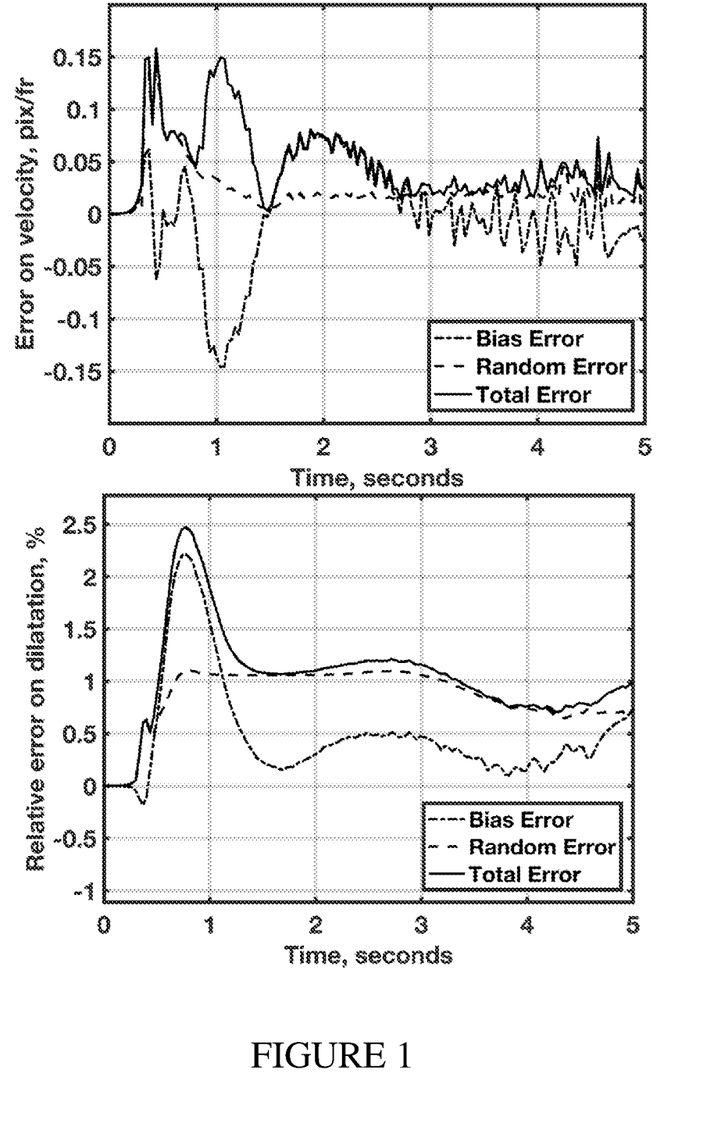
FIG. 1 illustrates error on velocity and relative error on dilatation for 30 frames per second.

Next, Fourier-based analysis is used for item (in some embodiments the item is a pupil) motion estimation. Corrected frames from the previous steps are converted into greyscale compliments in order to make the pupil the dominant signal. Such greyscale compliment images are fast Fourier transformed (FFT) and processed for Fourier-Mellin transform (FMT) Fourier-based correlation. The magnification from the correlation for each frame pair is stored and used to determine dilatation percent and dilatation velocity. The above procedure results in higher frame rates and lower dilation rate error. It is also found that the maximum error using the above procedure is at least a full order of magnitude lower than current methods. FIG. 1 illustrates error on velocity and relative error on dilatation for 30 frames per second.

Example 1

A software architecture encoded on a non-transitory computer readable medium, the software architecture processing a method of processing a video, wherein the method includes discarding a set of unusable frames from a video, wherein the video includes an object of interest. The method further includes selecting a set of usable frames and a reference frame from the video. Additionally, the method includes performing a first registration of each usable frame of the set of useable frames to the reference frame, thereby generating a set of updated usable frames. Further, the method includes storing a plurality of variables corresponding to the object of interest from each updated usable frame using a feature extraction algorithm. Moreover, the method includes detecting the object of interest from the each updated usable frame using the feature extraction algorithm. Additionally, the method includes determining a sub region containing the object of interest in the each updated useable frame. Further, the method includes performing color image contrast enhancement on each sub region of the each updated usable frame, thereby producing a plurality of enhanced updated usable sub region frames. Additionally, the method includes converting each enhanced updated useable sub region frame of the plurality of enhanced updated usable sub region frames into a grayscale sub region frame, thereby producing a plurality of greyscale sub region frames. Further, the method includes performing a second registration of each greyscale sub region frame of the plurality of greyscale sub region frames, thereby generating a plurality of updated greyscale sub region frames. Furthermore, the method includes calculating transformation parameters between each of the plurality of updated greyscale sub region frames. In some embodiments, the method includes calculating a scaling coefficient between each of the plurality of updated greyscale sub region frames.

In at least one embodiment, the discarding the set of unusable frames from the video includes discarding the set of unusable frames from the video that are oversaturated. In some embodiments, the object of interest includes an eye.

In one or more embodiment, the performing the first registration of the each usable frame of the set of useable frames to the reference frame includes estimating a translation in a horizontal direction between the each usable frame of the set of usable frames and the reference frame through a cross-correlation method, thereby creating a first estimation. The above method includes estimating a translation in a vertical direction between the each usable frame of the set of usable frames and the reference frame through the cross-correlation method, thereby creating a second estimation. The method further includes estimating a magnification between the each usable frame of the set usable frames and the reference frame through a Fourier-Mellin Transform and a Fourier-based cross-correlation, thereby creating a third estimation. Additionally, the method includes transforming the each usable frame of the set of usable frames into the reference frame by the first estimation, the second estimation, and the third estimation using a transformation. The method additionally includes performing the first registration until the transformation of the each usable frame into the reference frame by at least one of the first estimation, the second estimation, or the third estimation falls below a threshold criterion.

In at least one embodiment, the cross-correlation method includes a Fourier-based cross-correlation method and the transformation includes at least one of a similarity transformation, an affine transformation, a linear transformation, or a non-linear transformation.

In some embodiments, the threshold criterion is 0.001 pixels per frame.

In some embodiments, the feature extraction algorithm includes a Haar-like feature detector.

In one or more embodiments, the plurality of variables includes at least one of: a center point in pixels for the object of interest in the horizontal direction; a center point in pixels for the object of interest in the vertical direction; a size in pixels for a region over which the object of interest exists in the horizontal direction; or a size in pixels for a region over which the object of interest exists in the vertical direction.

In some embodiments, the sub region includes a center point window position in a horizontal direction, a center point window position in a vertical direction, a window height, and a window width.

In at least one embodiment, the performing color image contrast enhancement on the each sub region of the each updated usable frame includes transforming the each sub region from RGB (Red-Green-Blue) color space to HLS (Hue-Saturation-Luminance) color space, thereby generating a plurality of HLS sub regions. The above method additionally includes equalizing pixel values in a Saturation channel and a Luminance channel for each HLS sub region using Histogram Equalization. Further, the above method includes transforming each HLS sub region into RGB color space.

In various embodiments, the performing the second registration of the each greyscale sub region frame of the plurality of greyscale sub region frames, thereby generating the plurality of updated greyscale sub region frames includes estimating a magnification change between the object of interest in a first greyscale sub region frame of the plurality of greyscale sub region frames and a second greyscale sub region frame of the plurality of greyscale sub region frames using a Fourier-Mellin Transformation and Fourier-based cross-correlation, thereby creating a estimated magnification. The first greyscale sub region frame is a sequentially earlier frame of the plurality of greyscale sub region frames, and the second greyscale sub region frame is a sequentially later frame of the plurality of greyscale sub region frames. The above method further includes transforming the second greyscale sub region frame by the estimated magnification using a Similarity Transform.

Moreover, the method includes performing the second registration until the transformation of the second greyscale sub region by the estimated magnification using the Similarity Transform falls below a threshold criterion.

In some embodiments, the threshold criterion is 0.001 pixels per frame.

In one or more embodiments, the calculating transformation parameters between the plurality of updated greyscale sub region frames includes calculating at least one pupil dilation velocity from a magnification measurement between the plurality of updated greyscale sub region frames. The method further includes integrating multiple pupil dilation velocities for each pair of the plurality of updated greyscale sub region frames. Moreover, the method includes obtaining a value for a pupil dilation ratio as a function of time.

Example 2

A software architecture encoded on a non-transitory computer readable medium, wherein the software architecture includes a first protocol, wherein the first protocol is configured to discard a set of unusable frames from a video, wherein the video includes an object of interest. The architecture further includes a second protocol, wherein the second protocol is configured to select a set of usable frames and a reference frame from the video. Additionally, the architecture includes a third protocol, wherein the third protocol is configured to perform a first registration of each usable frame of the set of useable frames to the reference frame, thereby generating a set of updated usable frames. Further, the architecture includes a fourth protocol, wherein the fourth protocol is configured to store a plurality of variables corresponding to the object of interest from each updated usable frame using a feature extraction algorithm. Moreover, the architecture includes a fifth protocol, wherein the fifth protocol is configured to detect the object of interest from the each updated usable frame using the feature extraction algorithm. Additionally, the architecture includes a sixth protocol, wherein the sixth protocol is configured to determine a sub region containing the object of interest in the each updated useable frame. Further, the architecture includes a seventh protocol, wherein the seventh protocol is configured to perform color image contrast enhancement on each sub region of the each updated usable frame, thereby producing a plurality of enhanced updated usable sub region frames. Additionally, the architecture includes an eighth protocol, wherein the eighth protocol is configured to convert each enhanced updated useable sub region frame of the plurality of enhanced updated usable sub region frames into a grayscale sub region frame, thereby producing a plurality of greyscale sub region frames. Further, the architecture includes a ninth protocol, wherein the ninth protocol is configured to perform a second registration of each greyscale sub region frame of the plurality of greyscale sub region frames, thereby generating a plurality of updated greyscale sub region frames. Furthermore, the architecture includes a tenth protocol, wherein the tenth protocol is configured to calculate transformation parameters between each of the plurality of updated greyscale sub region frames. In some embodiments, the tenth protocol includes an eleventh protocol, wherein the eleventh protocol is configured to calculate a scaling coefficient between each of the plurality of updated greyscale sub region frames.

In at least one embodiment, the first protocol includes a twelfth protocol, wherein the twelfth protocol is configured to discard the set of unusable frames from the video that are oversaturated. In some embodiments, the object of interest includes an eye.

In one or more embodiment, the third protocol includes a thirteenth protocol, wherein the thirteenth protocol is configured to estimate a translation in a horizontal direction between the each usable frame of the set of usable frames and the reference frame through a cross-correlation method protocol, thereby creating a first estimation. The above architecture includes a fourteenth protocol, wherein the fourteenth protocol is configured to estimate a translation in a vertical direction between the each usable frame of the set of usable frames and the reference frame through the cross-correlation method protocol, thereby creating a second estimation. The architecture further includes a fifteenth protocol, wherein the fifteenth protocol is configured to estimate a magnification between the each usable frame of the set usable frames and the reference frame through a Fourier- Mellin Transform and a Fourier-based cross-correlation, thereby creating a third estimation. Additionally, the architecture includes a sixteenth protocol, wherein the sixteenth protocol is configured to transform the each usable frame of the set of usable frames into the reference frame by the first estimation, the second estimation, and the third estimation using a transformation protocol. The architecture additionally includes a seventeenth protocol, wherein the seventeenth protocol is configured to perform the first registration until the transformation of the each usable frame into the reference frame by at least one of the first estimation, the second estimation, or the third estimation falls below a threshold criterion.

In at least one embodiment, the cross-correlation method protocol includes a Fourier-based cross-correlation method protocol and the transformation protocol includes at least one of a similarity transformation protocol, an affine transformation protocol, a linear transformation protocol, or a non-linear transformation protocol.

In some embodiments, the threshold criterion is 0.001 pixels per frame.

In some embodiments, the feature extraction algorithm includes a Haar-like feature detector.

In one or more embodiments, the plurality of variables includes at least one of: a center point in pixels for the object of interest in the horizontal direction; a center point in pixels for the object of interest in the vertical direction; a size in pixels for a region over which the object of interest exists in the horizontal direction; or a size in pixels for a region over which the object of interest exists in the vertical direction.

In some embodiments, the sub region includes a center point window position in a horizontal direction, a center point window position in a vertical direction, a window height, and a window width.

In at least one embodiment, the seventh protocol includes an eighteenth protocol, wherein the eighteenth protocol is configured to transform the each sub region from RGB (Red-Green-Blue) color space to HLS (Hue-Luminance-Saturation) color space, thereby generating a plurality of HLS sub regions. The above architecture additionally includes a nineteenth protocol, wherein the nineteenth protocol is configured to equalize pixel values in a Saturation channel and a Luminance channel for each HLS sub region using Histogram Equalization. Further, the above architecture includes a twentieth protocol, wherein the twentieth protocol is configured to transform each HLS sub region into RGB color space.

In various embodiments, the ninth protocol includes a twenty-first protocol, wherein the twenty-firth protocol is configured to estimate a magnification change between the object of interest in a first greyscale sub region frame of the plurality of greyscale sub region frames and a second greyscale sub region frame of the plurality of greyscale sub region frames using a Fourier-Mellin Transformation and Fourier-based cross-correlation, thereby creating a estimated magnification. The first greyscale sub region frame is a sequentially earlier frame of the plurality of greyscale sub region frames, and the second greyscale sub region frame is a sequentially later frame of the plurality of greyscale sub region frames. The above architecture further includes a twenty-second protocol, wherein the twenty-second protocol is configured to transform the second greyscale sub region frame by the estimated magnification using a Similarity Transform.

Moreover, the architecture includes a twenty-third protocol, wherein the twenty-third protocol is configured to perform the second registration until the transformation of the second greyscale sub region by the estimated magnification using the Similarity Transform falls below a threshold criterion.

In some embodiments, the threshold criterion is 0.001 pixels per frame.

In one or more embodiments, the tenth protocol includes a twenty-fourth protocol, wherein the twenty-fourth protocol is configured to calculate at least one pupil dilation velocity from a magnification measurement between the plurality of updated greyscale sub region frames. The architecture further includes a twenty-fifth protocol, wherein the twenty-fifth protocol is configured to integrate multiple pupil dilation velocities for each pair of the plurality of updated greyscale sub region frames. Moreover, the architecture includes a twenty-sixth protocol, wherein the twenty-sixth protocol is configured to obtain a value for a pupil dilation ratio as a function of time.

Figure 2:
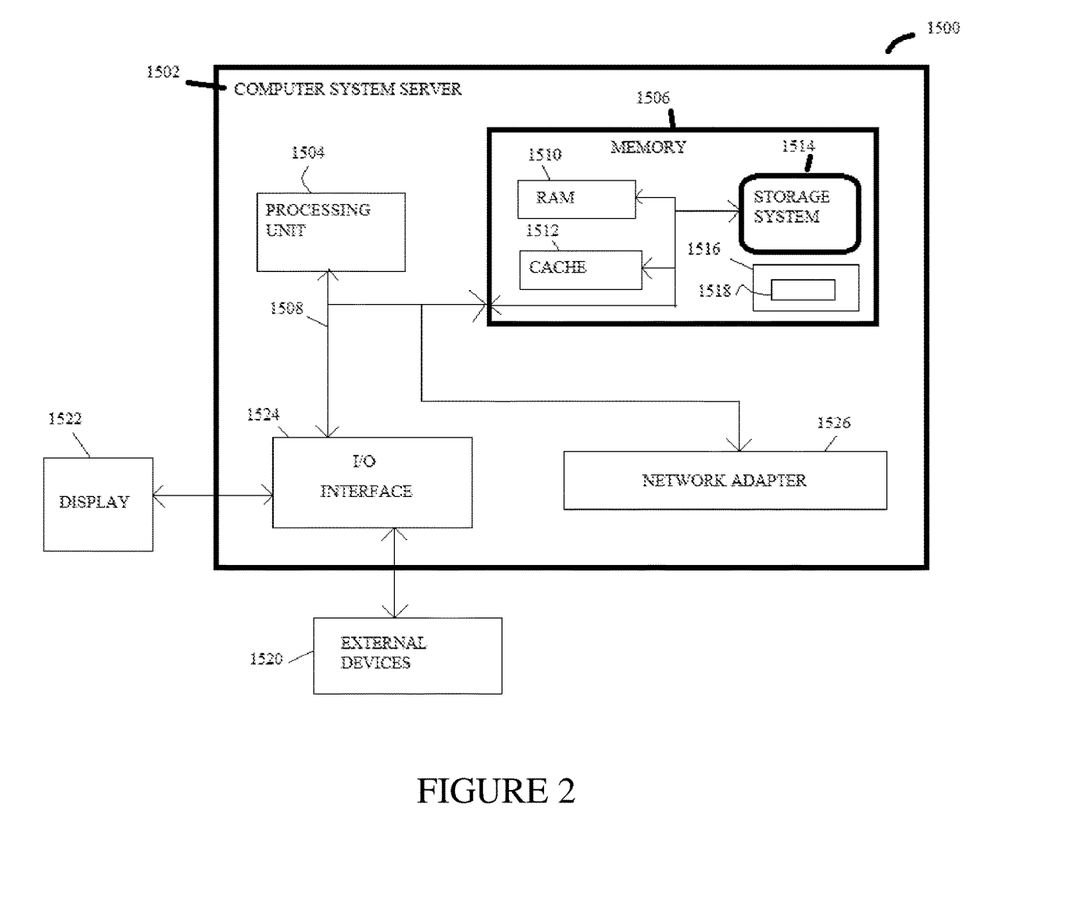
FIG. 2 illustrates one example of a computing or processing node 1500 for operating a method or a software architecture in accordance with the present application.

FIG. 2 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A software architecture encoded on a non-transitory computer readable medium, the software architecture processing a method of processing a video, wherein the method comprises:

discarding a set of unusable frames from a video, wherein the video comprises an object of interest;

selecting a set of usable frames and a reference frame from the video;

performing a first registration of each usable frame of the set of useable frames to the reference frame, thereby generating a set of updated usable frames;

storing a plurality of variables corresponding to the object of interest from each updated usable frame using a feature extraction algorithm;

detecting the object of interest from the each updated usable frame using the feature extraction algorithm;

determining a sub region containing the object of interest in the each updated useable frame;

performing color image contrast enhancement on each sub region of the each updated usable frame, thereby producing a plurality of enhanced updated usable sub region frames;

converting each enhanced updated useable sub region frame of the plurality of enhanced updated usable sub region frames into a grayscale sub region frame, thereby producing a plurality of greyscale sub region frames;

performing a second registration of each greyscale sub region frame of the plurality of greyscale sub region frames, thereby generating a plurality of updated greyscale sub region frames; and calculating transformation parameters between the plurality of updated greyscale sub region frames.

2. The method of claim 1, wherein the discarding the set of unusable frames from the video comprises:
discarding the set of unusable frames from the video that are oversaturated.

3. The method of claim 1, wherein the object of interest comprises an eye.

4. The method of claim 1, wherein the performing the first registration of the each usable frame of the set of useable frames to the reference frame comprises:
estimating a translation in a horizontal direction between the each usable frame of the set of usable frames and the reference frame through a cross-correlation method, thereby creating a first estimation;
estimating a translation in a vertical direction between the each usable frame of the set of usable frames and the reference frame through the cross-correlation method, thereby creating a second estimation;
estimating a magnification between the each usable frame of the set usable frames and the reference frame through a Fourier-Mellin Transform and a Fourier-based cross-correlation, thereby creating a third estimation; and
transforming the each usable frame of the set of usable frames into the reference frame by the first estimation, the second estimation, and the third estimation using a transformation.

5. The method of claim 4, wherein the cross-correlation method comprises a Fourier-based cross-correlation method and the transformation comprises at least one of a similarity transformation, an affine transformation, a linear transformation, or a non-linear transformation.

6. The method of claim 4, further comprising:
performing the first registration until the transformation of the each usable frame into the reference frame by at least one of the first estimation, the second estimation, or the third estimation falls below a threshold criterion.

7. The method of claim 6, wherein the threshold criterion is 0.001 pixels per frame.

8. The method of claim 1, wherein the feature extraction algorithm comprises a Haar-like feature detector.

9. The method of claim 1, wherein the plurality of variables comprises at least one of:
a center point in pixels for the object of interest in the horizontal direction;
a center point in pixels for the object of interest in the vertical direction;
a size in pixels for a region over which the object of interest exists in the horizontal direction; or
a size in pixels for a region over which the object of interest exists in the vertical direction.

10. The method of claim 1, wherein the sub region comprises a center point window position in a horizontal direction, a center point window position in a vertical direction, a window height, and a window width.

11. The method of claim 1, wherein the performing color image contrast enhancement on the each sub region of the each updated usable frame comprises:
transforming the each sub region from RGB (Red-Green-Blue) color space to HLS (Hue-Saturation-Luminance) color space, thereby generating a plurality of HLS sub regions;
equalizing pixel values in a Saturation channel and a Luminance channel for each HLS sub region using Histogram Equalization; and
transforming each HLS sub region into RGB color space.

12. The method of claim 1, wherein the performing the second registration of the each greyscale sub region frame of the plurality of greyscale sub region frames, thereby generating the plurality of updated greyscale sub region frames comprises:
estimating a magnification change between the object of interest in a first greyscale sub region frame of the plurality of greyscale sub region frames and a second greyscale sub region frame of the plurality of greyscale sub region frames using a Fourier-Mellin Transformation and Fourier-based cross-correlation, thereby creating a estimated magnification, wherein the first greyscale sub region frame is a sequentially earlier frame of the plurality of greyscale sub region frames, and the second greyscale sub region frame is a sequentially later frame of the plurality of greyscale sub region frames; and
transforming the second greyscale sub region frame by the estimated magnification using a Similarity Transform.

13. The method of claim 12, further comprising:
performing the second registration until the transformation of the second greyscale sub region by the estimated magnification using the Similarity Transform falls below a threshold criterion.

14. The method of claim 13, wherein the threshold criterion is 0.001 pixels per frame.

15. The method of claim 1, wherein the calculating transformation parameters between the plurality of updated greyscale sub region frames comprises:
calculating at least one pupil dilation velocity from a magnification measurement between the plurality of updated greyscale sub region frames.

16. The method of claim 15 further comprising:
integrating multiple pupil dilation velocities for each pair of the plurality of updated greyscale sub region frames.

17. The method of claim 16 further comprising:
obtaining a value for a pupil dilation ratio as a function of time.

18. The method of claim 1, wherein the calculating transformation parameters between the plurality of updated greyscale sub region frames comprises:
calculating a scaling coefficient between the plurality of updated greyscale sub region frames.

19. A software architecture encoded on a non-transitory computer readable medium, the software architecture processing a method of processing a video, wherein the method comprises:
discarding a set of unusable frames from a video, wherein the video comprises an object of interest;
selecting a set of usable frames and a reference frame from the video;
performing a first registration of each usable frame of the set of useable frames to the reference frame, thereby generating a set of updated usable frames;
storing a plurality of variables corresponding to the object of interest from each updated usable frame using a feature extraction algorithm;
detecting the object of interest from the each updated usable frame using the feature extraction algorithm;
determining a sub region containing the object of interest in the each updated useable frame;
performing color image contrast enhancement on each sub region of the each updated usable frame, thereby producing a plurality of enhanced updated usable sub region frames;

converting each enhanced updated useable sub region frame of the plurality of enhanced updated usable sub region frames into a grayscale sub region frame, thereby producing a plurality of greyscale sub region frames;

performing a second registration of each greyscale sub region frame of the plurality of greyscale sub region frames, thereby generating a plurality of updated greyscale sub region frames;

calculating transformation parameters between the plurality of updated greyscale sub region frames; and calculating a scaling coefficient between the plurality of updated greyscale sub region frames.

20. A software architecture encoded on a non-transitory computer readable medium, the software architecture processing a method of processing a video, wherein the method comprises:

discarding a set of unusable frames from a video, wherein the video comprises an object of interest, wherein the object of interest comprises an eye;

selecting a set of usable frames and a reference frame from the video;

performing a first registration of each usable frame of the set of useable frames to the reference frame, thereby generating a set of updated usable frames;

storing a plurality of variables corresponding to the object of interest from each updated usable frame using a feature extraction algorithm;

detecting the object of interest from the each updated usable frame using the feature extraction algorithm;

determining a sub region containing the object of interest in the each updated useable frame;

performing color image contrast enhancement on each sub region of the each updated usable frame, thereby producing a plurality of enhanced updated usable sub region frames;

converting each enhanced updated useable sub region frame of the plurality of enhanced updated usable sub region frames into a grayscale sub region frame, thereby producing a plurality of greyscale sub region frames;

performing a second registration of each greyscale sub region frame of the plurality of greyscale sub region frames, thereby generating a plurality of updated greyscale sub region frames;

calculating transformation parameters between the plurality of updated greyscale sub region frames; and calculating a scaling coefficient between the plurality of updated greyscale sub region frames.

* * * * *